(12) United States Patent

Olsson et al.

(10) Patent No.: US 12,683,147 B2

(45) Date of Patent: Jul. 14, 2026

(54) METHOD FOR PRODUCING A GRANULAR CARBON-CARBON COMPOSITE FROM A LIGNIN-CARBON COMPOSITE

(71) Applicant: Stora Enso OYJ, Helsinki (FI)

(72) Inventors: Vilhelm Olsson, Täby (SE); Stephan Walter, Bochum (DE); Mario Wachtler, Strängnäs (SE); Mats Lindström, Vanda (FI)

(73) Assignee: Stora Enso OYJ, Helsinki (FI)

( * ) Notice: Subject to any disclaimer, the term of this patent is extended or adjusted under 35 U.S.C. 154(b) by 208 days.

(21) Appl. No.: 18/717,639

(22) PCT Filed: Dec. 7, 2022

(86) PCT No.: PCT/IB2022/061879

§ 371 (c)(1),
(2) Date: Jun. 7, 2024

(87) PCT Pub. No.: WO2023/105438

PCT Pub. Date: Jun. 15, 2023

(65) Prior Publication Data

US 2025/0062318 A1    Feb. 20, 2025

(30) Foreign Application Priority Data

Dec. 10, 2021    (SE) .................................. 2151514-3

(51) Int. Cl.
H01M 4/587 (2010.01)
H01B 1/24 (2006.01)
H01M 4/36 (2006.01)

(52) U.S. Cl.
CPC .............. H01M 4/364 (2013.01); H01B 1/24 (2013.01); H01M 4/587 (2013.01)

(58) Field of Classification Search
CPC .......... H01B 1/00; H01B 1/24; H01M 4/043; H01M 4/0471; H01M 4/364; H01M 4/587; H01M 4/663
See application file for complete search history.

(56) References Cited

U.S. PATENT DOCUMENTS

| | | |
|---|---|---|
| 5,843,393 A | 12/1998 | Denton, III |
| 6,099,990 A | 8/2000 | Denton, III |

| | | | |
|---|---|---|---|
| 2014/0287315 A1 | 9/2014 | Troegel et al. | |
| 2015/0068112 A1* | 3/2015 | Varvemaa ................ | C07G 1/00 366/342 |
| 2015/0232339 A1* | 8/2015 | Wei ........................ | C01B 32/154 264/29.2 |

FOREIGN PATENT DOCUMENTS

| | | | |
|---|---|---|---|
| CN | 104058404 A | 9/2014 | |
| EP | 3691000 A1 | 2/2020 | |
| WO | 2006031175 A1 | 3/2006 | |
| WO | 2015097641 A1 | 7/2015 | |
| WO | WO-2015173479 A1 * | 11/2015 | ........... C04B 35/522 |
| WO | 2020183383 A1 | 9/2020 | |

OTHER PUBLICATIONS

Beisl et al "Lignin from Micro- to Nanosize: Production Methods", Int. J. Mol. Sci. 2017, 18, 1244; doi: 10.3390/ijms18061244.*

Guota et al "Synthesis, Characterization and Application of Lignin Nanoparticles (LNPs)", Materials Focus vol. 3, pp. 444-454, 2014 (www.aspbs.com/mat).*

Extended European Search Report from corresponding European application No. 22903702.3 dated Feb. 11, 2026. (8 pages).

Li, S. et al., "Co-pyrolysis characteristic of biomass and bituminous coal" Bioresource Technology 179 (2015) 414-420.

Wu, Z. et al "Morphology and microstructure of co-pyrolysis char from bituminous coal blended with lignocellulosic biomass: Effects of cellulose, hemicellulose and lignin" Applied Thermal Engineering 116 (2017) 24-32.

Zhang W. et al "Facile preparation of 3D hierarchial porous carbon from lignin for the anode material in lithium ion battery with high rate performance" Electrochimica Acta, 2015, vol. 176, pp. 1136-1142.

International Search Report from corresponding PCT application No. PCT/IB2022/061879, mailed Feb. 27, 2023.

* cited by examiner

*Primary Examiner* — Mark Kopec

(74) *Attorney, Agent, or Firm* — Greer, Burns & Crain, Ltd.

(57) ABSTRACT

The present invention is directed to a method for producing a thermally stabilized agglomerated lignin-carbon composite material. The method involves the steps of providing an agglomerated lignin-carbon composite material comprising lignin and at least one carbon additive; and heating the agglomerated lignin-carbon composite material to obtain the thermally stabilized agglomerated lignin-carbon composite material. The invention is also directed to a granular carbon-carbon composite material obtained by heat treatment of the thermally stabilized agglomerated lignin-carbon composite material.

20 Claims, No Drawings

METHOD FOR PRODUCING A GRANULAR CARBON-CARBON COMPOSITE FROM A LIGNIN-CARBON COMPOSITE

This application is a U.S. National Phase under 35 U.S.C. § 371 of International Application No. PCT/IB2022/061879, filed Dec. 7, 2022, which claims priority under 35 U.S.C. §§ 119 and 365 to Swedish Application No. 2151514-3 filed Dec. 10, 2021.

FIELD OF THE INVENTION

The present invention relates to a method for producing a thermally stabilized agglomerated lignin-carbon composite material. The present invention also relates to a thermally stabilized lignin-carbon composite material. Further, the present invention relates to a method for producing a granular carbon-carbon composite and a granular carbon-carbon composite obtainable by the method, wherein the granular carbon-carbon composite is prepared from said thermally stabilized agglomerated lignin-carbon composite. In addition, the invention relates to a carbon-carbon composite powder obtainable from said granular carbon-carbon composite material, and a negative electrode for a non-aqueous secondary battery comprising said carbon-carbon composite material powder as active material. The invention further relates to use of said carbon-carbon composite material powder as active material in a negative electrode of a non-aqueous secondary battery.

BACKGROUND

Secondary batteries, such as lithium-ion batteries, are electrical batteries which can be charged and discharged many times, i.e. they are rechargeable batteries. In lithium-ion batteries, lithium ions flow from the negative electrode through the electrolyte to the positive electrode during discharge, and back when charging. Typically, a lithium compound, in particular a lithium metal oxide such as lithium nickel manganese cobalt oxide (NMC) or alternatively a lithium iron phosphate (LFP), is utilized as material of the positive electrode and a carbon enriched material is utilized as material of the negative electrode.

Graphite (natural or synthetic graphite) is today utilized as material of the negative electrode in most lithium-ion batteries. An alternative to graphite is amorphous carbon materials, such as hard carbons (non-graphitizable amorphous carbons) and soft carbons (graphitizable amorphous carbons), which lack long-range graphitic order. Amorphous carbons can be used as sole active electrode materials or in mixtures with graphite (and/or other active materials).

Amorphous carbons can be derived from lignin. Lignin is an aromatic polymer, which is a major constituent in e.g. wood and one of the most abundant carbon sources on earth. In recent years, with development and commercialization of technologies to extract lignin in a highly purified, solid and particularized form from the pulp-making process, it has attracted significant attention as a possible renewable substitute to primarily aromatic chemical precursors currently sourced from the petrochemical industry. Amorphous carbons derived from lignin are typically non-graphitizable, i.e. hard carbons.

Today, the most commercially relevant source of lignin is Kraft lignin, obtained from hardwood or softwood through the kraft process. The lignin can be separated from alkaline black liquor using for example membrane- or ultrafiltration. One common separation process is described in WO2006031175 A1. In this process lignin is precipitated from alkaline black liquor by addition of acid and then filtered off. The lignin filter cake is in the next step re-slurried under acidic conditions and washed prior to drying and pulverization.

One problem with using lignin as a precursor for a carbon enriched material is that direct use of lignin, in the form of a fine powder, is not suitable since it exhibits undesired thermoplastic behavior. During thermal conversion of lignin powder into carbon enriched materials, lignin undergoes plastic deformation/melting, aggressive swelling and foaming. This severely limits the processability of lignin in an industrially relevant scale, in terms of equipment dimensioning and process throughput as well as need of intermediate processing.

Inorganic additives, such as metal salts, has been used to partly reduce the melting/swelling behaviour of lignin during thermal processing. However, these metal salts are also causing catalytic activation of the carbon structure during carbonization and costly post-purification protocols are required in order to remove the metal salts from the final carbon enriched material.

U.S. Pat. No. 6,099,990 A describes a method of fabricating a carbon material, which involves the steps of mixing a lignin powder with a salt and then heating the mixture in several steps, involving a carbonization step.

Thus, there is still room for improvements of methods for producing a carbon enriched material from lignin. The method should avoid that lignin undergoes plastic deformation and melting, aggressive swelling and foaming during heating, as well as when converting lignin to a carbon enriched material. In addition, it should be possible to use the method in large-scale manufacturing.

SUMMARY OF THE INVENTION

It is an object of the present invention to provide an improved method for producing a carbon enriched material, which method allows use of a renewable carbon source, and which method eliminates or alleviates at least some of the disadvantages of the prior art methods.

It is a further object of the present invention to provide a method that obtains an improved carbon enriched material starting from lignin, which carbon enriched material is suitable for use as active material in a negative electrode of a secondary battery, such as a lithium-ion battery.

It is a further object of the present invention to provide a method for producing a carbon enriched material from lignin, which method allows heat treatment of lignin while retaining shape and dimension.

It is a further object of the present invention to provide a method for improving the mechanical and thermal processability of lignin.

It is a further object of the present invention to provide a method for producing a carbon enriched material from lignin, which method is scalable and thus suitable for large-scale manufacturing.

The above-mentioned object, as well as other objects as will be realized by the skilled person in light of the present disclosure, are achieved by the various aspects of the present disclosure.

According to a first aspect, the present invention relates to a method for producing a thermally stabilized agglomerated lignin-carbon composite material:

a) providing an agglomerated lignin-carbon composite material having a particle size distribution such that at least 80 wt % of the agglomerates have a diameter within the range of from 0.2 mm to 5.0 mm, and wherein said agglomerated lignin-carbon composite material comprises lignin and at least one carbon additive;

b) heating the agglomerated lignin-carbon composite material to a temperature in the range of from 140 to 250° C. for a period of at least 30 minutes to obtain a thermally stabilized agglomerated lignin-carbon composite material.

It has surprisingly been found that lignin which has undergone agglomeration into macroscopic particles and been thermally stabilized can be heat treated with retained shape and dimension, avoiding melting/swelling and deformation.

It has also surprisingly been found that the mechanical and thermal processability of the agglomerated lignin is improved by addition of at least one carbon additive. The at least one carbon additive is dispersed in the lignin matrix, thus forming an agglomerated lignin-carbon composite material. The carbon additive improves the thermal resistance of the agglomerated lignin-carbon composite material by reducing the melting/swelling behaviour upon heating which in turn improves processability on an industrial scale. By combining thermal stabilization and addition of a carbon additive, the processability of lignin is further improved.

According to a second aspect, the present invention relates to a thermally stabilized agglomerated lignin-carbon composite material with a particle size distribution such that at least 80 wt % of the agglomerates have a diameter within the range of from 0.2 mm to 5.0 mm, and wherein the carbon in the thermally stabilized agglomerated lignin-carbon composite material is in the form of at least one carbon additive. The thermally stabilized agglomerated lignin-carbon composite material of the second aspect can be obtained by the method according to the first aspect.

According to a third aspect, the present invention relates to a method for producing a granular carbon-carbon composite material, said method comprising the steps of:

1) providing a thermally stabilized agglomerated lignin-carbon composite material obtainable by the method according to the first aspect;

2) subjecting the thermally stabilized agglomerated lignin-carbon composite material to heat treatment at one or more temperatures in the range of from 300° C. to 1500° C., wherein the heat treatment is carried out for a total time in the range of from 30 minutes to 10 hours, to obtain a granular carbon-carbon composite material.

It has surprisingly been found that production of a carbon enriched material from lignin is facilitated by providing the lignin in the form of an agglomerated lignin-carbon composite material that has been thermally stabilized, as the thermally stabilized agglomerated lignin-carbon composite material will retain its dimensional integrity during further processing into carbon enriched materials.

By appropriate selection of the at least one carbon additive, in terms of e.g. particle size and amount, the processability of the lignin-carbon composite as well as the functionality of the resulting carbon enriched material, i.e. a granular carbon-carbon composite material, can be fine-tuned.

The granular carbon-carbon composite material obtainable with the method according to the third aspect may also be of use in applications such as activated carbon and biochars.

According to a fourth aspect, the present invention relates to a granular carbon-carbon composite material obtainable by the method according to the third aspect.

According to a fifth aspect, the present invention relates to a carbon-carbon composite material powder obtainable by pulverizing the granular carbon-carbon composite material obtained by the method according to the third aspect.

According to a sixth aspect, the present invention relates to a negative electrode for a non-aqueous secondary battery comprising the carbon-carbon composite material powder according to the fifth aspect.

According to a seventh aspect, the present invention relates to use of the carbon-carbon composite material powder according to the fifth aspect as active material in a negative electrode of a non-aqueous secondary battery.

DETAILED DESCRIPTION

Step a) of the method according to the first aspect of the present invention involves providing an agglomerated lignin-carbon composite material having a particle size distribution such that at least 80 wt % of the agglomerates have a diameter within the range of from 0.2 mm to 5.0 mm, preferably from 0.5 mm to 2.0 mm, and wherein said agglomerated lignin-carbon composite material comprises lignin and at least one carbon additive.

In the context of the present invention, the diameter of a particle is the equivalent spherical diameter of the particle, if the particle is not spherical. The equivalent spherical diameter is the diameter of a sphere of equivalent volume.

By providing the lignin-carbon composite material in agglomerated form, a more compact and hard material is achieved. Hard particles are advantageous during subsequent processing as they can resist physical impact during processing. In addition, the interactions between particles within the composite are enhanced in the agglomerated composite, as particles are present in close proximity to each other.

In one embodiment of the method according to the first aspect, the bulk density of the agglomerated lignin-carbon composite material is in the range of from 0.4 to 0.7 g/cm$^3$, preferably from 0.5 to 0.7 g/cm$^3$.

The term "lignin" as used herein, refers to any kind of lignin which may be used as the carbon source for making a carbon enriched material. Examples of said lignin are, but are not limited to, lignin obtained from vegetable raw material such as wood, e.g. softwood lignin, hardwood lignin, and lignin from annular plants. Also, lignin can be chemically modified.

Preferably, the lignin has been purified or isolated before being used in the process according to the present disclosure. The lignin may be isolated from black liquor and optionally be further purified before being used in the process according to the present disclosure. The purification is typically such that the purity of the lignin is at least 90%, preferably at least 95%. Thus, the lignin used according to the method of the present disclosure preferably contains less than 10%, more preferably less than 5%, impurities such as e.g. cellulose, ash, and/or moisture.

Preferably, the lignin contains less than 1% ash, more preferably less than 0.5% ash.

The lignin may be obtained through different fractionation methods such as an organosolv process or a Kraft process. For example, the lignin may be obtained by using the process disclosed in WO2006031175 A1.

Preferably, the lignin used in the method according to the first aspect of the present invention is Kraft lignin, i.e. lignin obtained through the Kraft process. Preferably, the Kraft lignin is obtained from hardwood or softwood, most preferably from softwood.

The term "carbon", as used herein in phrases such as "lignin-carbon composite" and "carbon-carbon composite", refers to carbon originating from any type of carbon additive that is added during processing of lignin to a carbon enriched material, and forms a composite material together with lignin. The carbon can originate from any type of carbon additive that can be used as a functionality enhancing material in a carbon enriched material derived from lignin. The term encompasses also carbon originating from any type of carbon additive which can be used to form a lignin-carbon composite material and that will provide the composite with improved thermal and mechanical processability while preparing a carbon enriched material starting from the lignin-carbon composite material.

The term "carbon additive" as used herein, encompasses carbonaceous materials such as: graphite, graphene, carbon nanotubes, charcoal, biochar, hard carbon, soft carbon, carbon black, carbon fibers and electrically conductive carbon. The carbon content in the carbon additive is at least 80 wt %, such as at least 90 wt % or at least 95 wt %. The term "carbon additive" as used herein does not refer to carbon atoms as such.

The term "lignin-carbon composite" as used herein in phrases such as "agglomerated lignin-carbon composite material" and "thermally stabilized agglomerated lignin-carbon composite material", refers to a composite comprising lignin and one or more carbon additive(s), e.g. a composite comprising lignin and graphite, a composite comprising lignin and hard carbon, or a composite comprising lignin, graphite and hard carbon. The term "lignin-carbon composite" further refers to a material comprising essentially only lignin and one or more carbon additive(s), such that at least 95 wt %, or at least 98 wt %, based on the dry weight of the lignin-carbon composite, of the lignin-carbon composite consists of lignin and one or more carbon additive(s).

The lignin-carbon composite may optionally also comprise small amounts, such as less than 5 wt %, or less than 2 wt %, of at least one additive. In the lignin-carbon composite, the one or more carbon additive(s) is uniformly dispersed within a lignin matrix.

The carbon in the agglomerated lignin-carbon composite material is in the form of at least one carbon additive. In some embodiments, the amount of the at least one carbon additive in the agglomerated lignin-carbon composite material is in the range of from 0.1 to 60 wt %, or from 0.1 to 30 wt %, or from 0.1 to 10 wt %, based on the dry weight of the agglomerated lignin-carbon composite material. In some embodiments, the amount of the at least one carbon additive in the agglomerated lignin-carbon composite material is in the range of from 10 to 60 wt %, or from 10 to 40 wt %, or from 20 to 40 wt %, based on the dry weight of the agglomerated lignin-carbon composite material.

The amount of the at least one carbon additive may depend on the type of carbon additive and its desired functionality in the composite material. For certain carbon additives, such as carbon nanotubes and graphene, the amount of the carbon additive in the agglomerated lignin-carbon composite material will preferably be small, such as in the range of from 0.1 to 5 wt % based on the dry weight of the agglomerated lignin-carbon composite material. For other carbon additives, such as graphite, the applicable range of the amount of carbon additive in the agglomerated lignin-carbon composite material may be large, such as from 0.1 to 60 wt % based on the dry weight of the agglomerated lignin-carbon composite material.

In some embodiments, the amount of lignin in the agglomerated lignin-carbon composite material is in the range of from 40-99.9 wt-% based on the dry weight of the agglomerated lignin-carbon composite material.

In one embodiment, the at least one carbon additive is selected from the group of graphite, graphene, carbon nanotubes, charcoal, biochar, hard carbon, soft carbon, carbon black, carbon fibers and electrically conductive carbon.

In some embodiments each carbon additive utilized is selected from the group of: graphite, graphene, carbon nanotubes, charcoal, biochar, hard carbon, soft carbon, carbon black, carbon fibers and electrically conductive carbon.

In some embodiments, only one carbon additive is present in the agglomerated lignin-carbon composite material. Preferably, the carbon additive is selected from the group of: graphite, charcoal, hard carbon or soft carbon.

In some embodiments, more than one carbon additive is present in the agglomerated lignin-carbon composite material. In a preferred embodiment using two carbon additives, the carbon additives are graphite and hard carbon.

In some embodiments, the carbon additive is an electrically conductive carbon, such as an electrically conductive carbon black, an electrically conductive graphite, an electrically conductive graphene or electrically conductive carbon nanotubes. The electrically conductive carbon may be the only carbon additive or it may be present together with at least one other carbon additive.

The use of a carbon additive together with lignin, as in an agglomerated lignin-carbon composite material, has been found to improve mechanical and thermal processability of lignin. The agglomerated lignin-carbon composite material has improved thermal resistance by reducing melting/swelling behaviour upon heating which improve processability on an industrial scale.

The term "agglomerated lignin-carbon composite material" as used herein refers to macroscopic particles in turn comprising clustered smaller particles of lignin and at least one carbon additive.

In a preferred embodiment of the method according to the first aspect, the agglomerated lignin-carbon composite material used in step a) of the inventive method is produced by a method comprising the steps of:

i) providing lignin in the form of a powder, wherein the particle size distribution of the lignin in the form of a powder is such that at least 80 wt % of the particles have a diameter less than 0.2 mm and a moisture content of less than 45 wt %;

ii) providing at least one carbon additive in the form of a powder; wherein the particle size distribution of the carbon additive in the form of a powder is such that at least 80 wt % of the particles have a diameter less than 0.1 mm;

iii) mixing the lignin powder, the at least one carbon additive powder, and optionally at least one additive so as to obtain a lignin-carbon mixture;

iv) compacting the lignin-carbon mixture obtained in step iii) so as to obtain a lignin-carbon composite material;

v) crushing the lignin-carbon composite material obtained in step iv) so as to obtain an agglomerated lignin-carbon composite material;

vi) optionally sieving the agglomerated lignin-carbon composite material obtained in step v) so as to remove particles having a particle diameter below 100 μm, thereby obtaining the agglomerated lignin-carbon composite material having a particle size distribution such that at least 80 wt-% of the agglomerates have a diameter within the range of from 0.2 mm to 5.0 mm.

The lignin in powder form provided in step i) is preferably dried before mixing with the at least one carbon additive. The drying of the lignin powder is carried out by methods and equipment known in the art. The lignin in powder form used in step i) has a moisture content of less than 45 wt %. Preferably, the moisture content of the lignin before mixing with the at least one carbon additive according to the present invention is less than 25 wt %, preferably less than 10 wt %, more preferably less than 8 wt %. In one embodiment, the moisture content of the lignin before mixing with the at least one carbon additive according to the present invention is at least 1 wt %, such as at least 5 wt %. The temperature during the drying is preferably in the range of from 80° C. to 160° C., more preferably in the range of from 100° C. to 120° C.

The lignin powder obtained after drying has a wide particle size distribution ranging from 1 μm to 2 mm which is significantly skewed towards the micrometer range, meaning that a significant proportion of the particles has a diameter in the range of 1 to 200 μm. The lignin powder preferably has a bulk density in the range of from 0.3 g/cm³ to 0.4 g/cm³.

The at least one carbon additive provided in step ii) is in the form of a powder. The at least one carbon additive is preferably dried before mixing with the lignin. Preferably, the carbon additive has a moisture content of less than 20 wt %, preferably less than 10 wt %, more preferably less than 5 wt %. In one embodiment, the carbon additive has a moisture content in the range of from 0 to 20 wt %, such as from 0 to 10 wt % or from 0 to 5 wt %. In one embodiment, the carbon additive has a moisture content in the range of from 0.1 to 20 wt %, such as from 0.1 to 10 wt % or from 0.1 to 5 wt %.

The at least one carbon additive provided in step ii) preferably have a smaller particle size than the lignin. Preferably, the particle size distribution of the at least one carbon additive in the form of a powder is such that at least 80 wt % of the particles have a diameter less than 0.1 mm. In one embodiment, the particle size distribution of the at least one carbon additive in the form of a powder is such that at least 80 wt % of the particles have a diameter in the range of from 5 nm to 20 μm.

In some embodiments, one carbon additive is utilized, i.e. the step of providing at least one carbon additive comprises providing one carbon additive. In some embodiments, more than one carbon additive is utilized, i.e. the step of providing at least one carbon additive comprises providing two, three, four or more carbon additives. Each carbon additive may be selected from the carbon additives mentioned above.

In step iii) the lignin in the form of a powder is mixed with the at least one carbon additive in the form of a powder and optionally at least one additive so as to obtain a lignin-carbon mixture.

The mixing is performed by methods and equipment as known in the art. One example of a suitable method is a vertical mixer, such as paddle, screw or ribbon-screw mixer in a batch or continuous mode. The mixing process may be carried out in a low-, medium- or high-shear impact mode.

In some embodiments, at least one additive may be added during or prior to mixing. Any suitable additives, such as binders or lubricants, may be added to facilitate the subsequent compaction process and to improve the density and mechanical properties of the obtained lignin-carbon composite material. In addition, additives having an influence on the properties of the final material may be added, such as functionality-enhancing additives. The total amount of additive(s) is preferably less than 5 wt %, such as from 0 to 5 wt %, or from 0.1 to 5 wt %, or less than 2 wt %, such as from 0 to 2 wt %, or from 0.1 to 2 wt %, as based on the total dry weight of the lignin-carbon powder mixture.

In some embodiments, the mixing is performed during at least 1 minutes, or at least 10 minutes, or at least 15 minutes. In some embodiments, the mixing is performed in the range of from 1 to 60 minutes, or from 1 to 30 minutes, or from 1 to 10 minutes. The dispersion of the at least one carbon additive within the lignin is improved by increasing the mixing time.

In some embodiments, the mixing is performed at a mixing speed of at least 100 rpm, such as at least 200 rpm or at least 300 rpm. In some embodiments, the mixing speed is in the range of from 100 to 3000 rpm, or from 100 to 1500 rpm, or from 100 to 1000 rpm. The dispersion of the at least one carbon additive within the lignin is improved by increasing the mixing speed.

During mixing, the temperature of the mixture may increase due to friction. In one embodiment, the temperature of the powders during mixing is maintained in a range of from 20 to 100° C. The temperature can be maintained by means of heating or cooling the apparatus used for mixing.

As mentioned above, the dispersion of the at least one carbon additive within the lignin matrix is improved both by a sufficient mixing time, a suitable mixing speed and a suitable mixing temperature, so that a uniform distribution of the at least one carbon additive within the lignin matrix is achieved. A uniform dispersion in the lignin-carbon powder mixture ensures a uniform dispersion also after compaction, in the formed agglomerates.

In one embodiment, the mixing is performed by dry mixing. The term "dry mixing" as used herein, refers to a process of mixing components which are all in the dry state, i.e. not present in a dispersion or slurry or any other type of solution. The components may have a moisture content of less than 10 wt % during mixing. In a preferred embodiment, both the lignin and the carbon additive are in the form of a dry powder during the mixing step. Thus, the obtained lignin-carbon mixture is in the form of a dry powder.

In one embodiment, mixing of the lignin powder and the at least one carbon additive in the form of a powder is performed at the same time as milling of the powder(s) in order to reduce the particle size of the powder particles. Milling can be performed by methods such as impact milling, hammer milling, ball milling and jet milling. In one embodiment, milling of the powders is performed immediately prior to mixing. By performing mixing by dry mixing, a simple process of mixing the lignin powder and the at least one carbon additive powder is obtained. The dry mixing step is easily integrated with subsequent processing steps.

Mixing of the lignin powder and the at least one carbon additive in the form of a powder may be performed using any suitable equipment known in the art. For example, if a particular high level of mixing is desired, high impact dry blending machines suitable for mechanochemical treatment, or hybridization can be used.

A uniform distribution of the at least one carbon additive in the agglomerated lignin-carbon composite material will ensure a uniform distribution also in a granular carbon-carbon composite material obtained from the agglomerated lignin-carbon composite material. A good functionality of the granular carbon-carbon composite is achieved by a uniform distribution of the carbon additive.

In one embodiment, the bulk density of the lignin-carbon powder mixture is in the range of from 0.3 to 0.5 g/cm³.

In step iv), the lignin-carbon powder mixture is compacted to obtain a lignin-carbon composite material. The compaction of the lignin-carbon powder mixture is preferably carried out by roll compaction. The roll compaction of the lignin-carbon powder mixture can be achieved by a roller compactor to press the lignin-carbon powder mixture into a composite material.

In the compaction step, a compacted lignin-carbon composite material is generated. Here, the fine lignin-carbon powder mixture is usually fed through a hopper and conveyed by means of a horizontal or vertical feeding screw into the compaction zone where the material is compacted into flakes by compaction rollers with a defined gap. By controlling the feeding screw speed, the pressure development in the compaction zone, flakes with uniform density can be obtained. The pressure development in the compaction zone can preferably be monitored and controlled by the rotational speed of the compaction rolls. As the powder is dragged between the rollers, it enters what is termed as the nip area where the density of the material is increased and the powder is converted into a flake or ribbon. The rolls used have cavities. The depth of each cavity used in the roll compaction is from 0.1 mm to 10 mm, preferably from 1 mm to 8 mm, more preferably from 1 mm to 5 mm or from 1 mm to 3 mm. The specific press force exerted during the compaction may vary depending on the equipment used for compaction, but may be in the range of from 1 kN/cm to 100 kN/cm. Equipment suitable for carrying out the compaction are known in the art.

In a preferred embodiment, the temperature of the lignin-carbon powder mixture is kept below 150° C., such as below 100° C., during the compaction process.

In one embodiment of the roll compaction, the roll configuration is such that the first roll has an annual rim in such configuration so that the lignin-carbon powder mixture in the nip region is sealed in the axial direction along the roller surface.

In one embodiment, the roll configuration is such that the nip region is sealed in the axial direction along the roller surface with a static plate. By ensuring that the nip region is sealed, loss of lignin-carbon powder at the axial ends of the rollers is minimized as compared to entirely cylindrical nip rollers.

During compaction, a lignin-carbon composite material is formed as the materials are pressed together by mechanical pressure. The dispersion of the at least one carbon additive and lignin is improved as the particles of the respective powders are pressed into close proximity of each other. It has been found that the at least one carbon additive can facilitate the compaction process by reducing internal friction between lignin particles.

The compaction may also act to enhance the interactions between the lignin particles and the carbon additive particles in the composite, due to primary particle re-arrangement and plastic deformation induced by the mechanical force. The compaction will further act to ensure that the uniform distribution achieved in the mixing step is maintained until the lignin-carbon composite material can be further stabilized, i.e. by a thermal stabilization step.

Compaction may be carried out on a lignin-carbon powder mixture with no additives added. Alternatively, it may be carried out on a lignin-carbon powder mixture also comprising small amounts of at least one additive, such as less than 5 wt % as based on the total dry weight of the lignin-carbon powder mixture.

After compaction, crushing is preferably carried out. In the crushing step, the compacted lignin-carbon composite from the compaction step is subjected to crushing or grinding, such as by means of rotary granulator, cage mill, beater mill, hammer mill or crusher mill and/or combinations thereof. During this step, an agglomerated lignin-carbon composite material is generated, as the compacted lignin-carbon composite material is separated into agglomerates.

After crushing, the crushed material is preferably subjected to a sieving step, to remove fine material. In addition, large material, such as agglomerates having a diameter larger than 5.0 mm, may be removed and/or recirculated back to the crushing step.

In the sieving step, the agglomerated lignin-carbon composite material from the crushing step is screened by means of physical fractionation such as sieving, also referred to as screening, to obtain a product which is an agglomerated lignin-carbon composite material with a defined particle size distribution set by the porosity of the sieves or screens in this step. The sieve or screen is selected such that most particles having a diameter below 100 (or 500) μm pass through the screen and are rejected and preferably returned to the compaction step, whereas most particles having a diameter above 100 (or 500) μm are retained and subjected to the subsequent heating step of the process according to the present invention. The sieving may be carried out in more than one step, i.e. the sieving can be carried out such that the crushed material from the crushing step passes sequentially through more than one screen or sieve.

During the process of compaction, the bulk density of the material is increased as the material is pressed tightly together. In one embodiment, the bulk density of the agglomerated lignin-carbon composite material is in the range of from 0.5 to 0.7 $g/cm^3$. Due to the compaction of the lignin-carbon powder mixture during preparation of an agglomerated lignin-carbon composite material, the bulk density of the lignin-carbon powder mixture will increase as pressure is applied to the powder. This means that the agglomerated lignin-carbon composite material will have a higher bulk density than the lignin-carbon powder mixture. A more compact material may be beneficial during subsequent processing to carbon enriched materials, as an agglomerated lignin-carbon composite material have been found to retain its shape and dimensions with no melting or swelling. The agglomerated lignin-carbon composite material will also have a relatively higher hardness after compaction. Hard particles are advantageous during subsequent processing as they can resist physical impact during processing. As discussed above, the carbon additive will also improve the mechanical and thermal processability of lignin. The carbon additive can also enhance the stability of the agglomerated lignin-carbon composite material by reducing internal particle friction.

The agglomerated lignin-carbon composite material has a particle size distribution such that at least 80 wt % of the particles have a diameter in the range of from 0.2 mm to 5.0 mm. Preferably, the particle size distribution is such that at least 90 wt %, more preferably at least 95 wt %, of the particles have a diameter in the range of from 0.2 mm to 5.0 mm. More preferably, at least 90 wt %, more preferably at least 95 wt %, of the particles have a diameter in the range of from 0.5 mm to 2 mm.

In one embodiment, the agglomerated lignin-carbon composite material provided in step a) of the method according to the first aspect comprises from 40 to 99.9 wt % lignin, from 0.1 to 60 wt % of at least one carbon additive, and from 0 to 5 wt % of at least one additive, based on the dry weight of the agglomerated lignin-carbon composite material.

Step b) of the method according to the first aspect of the present invention involves heating the agglomerated lignin-carbon composite material to a temperature in the range of from 140 to 250° C. for a period of at least 30 minutes so as to obtain a thermally stabilized agglomerated lignin-carbon composite material.

The term "thermal stabilization" as used herein, refers to a process of heating the agglomerated lignin-carbon composite material at a temperature lower than the temperature required for carbonization of the material. By performing a thermal stabilization, the agglomerated lignin-carbon composite material can be heat treated with retained shape and dimension, avoiding melting/swelling and deformation.

By thermal stabilization, the outer surface of the agglomerated lignin-carbon composite material is stabilized so that it becomes hard and can retain its shape and dimension. The interior of the agglomerates will also be subjected to heating, which will soften/melt the lignin and facilitate the dispersion of carbon within the lignin matrix.

The thermally stabilized agglomerated lignin-carbon composite material preferably has a bulk density in the range of from 0.5 g/cm³ to 0.7 g/cm³. The thermal stabilization might lead to a slight increase or decrease in bulk density of the agglomerated lignin-carbon composite material. The bulk density will however preferably remain within the same range as that of the agglomerated lignin-carbon composite material prior to the thermal stabilization.

The step of heating the agglomerated lignin-carbon composite material to produce the thermally stabilized agglomerated lignin-carbon composite material can be carried out continuously or in batch mode. The heating can be carried out using methods known in the art and can be carried out in the presence of air or completely or partially under inert gas. Preferably, the heating is carried out in a rotary kiln, moving bed furnace or rotary hearth furnace.

The heating to produce the thermally stabilized agglomerated lignin-carbon composite material is carried out such that the agglomerated lignin-carbon composite material is heated to a temperature in the range of from 140 to 250° C., preferably from 180 to 230° C. The heating is carried out for at least 30 minutes, i.e. the residence time of the agglomerated lignin-carbon composite material inside the equipment used for the heating is at least 30 minutes. In one embodiment, the heating is carried out for at least 1 hour, or at least 1.5 hours. Preferably, the heating is carried out for less than 12 hours. The heating may be carried out at the same temperature throughout the entire heating stage or may be carried out at varying temperature, such as a stepwise increase of the temperature or using a temperature gradient. More preferably, the heating is carried out such that the agglomerated lignin-carbon composite material is first heated to a temperature in the range of from 140 to 175° C. for a period of at least 15 minutes and subsequently heated to a temperature in the range of from 175 to 250° C. for at least 15 minutes.

The thermally stabilized agglomerated lignin-carbon composite material comprises lignin, at least one carbon additive(s) and optionally at least one additive. Compared to the agglomerated lignin-carbon composite material prior to heating to obtain the thermally stabilized material, there may be a small weight loss during the heating. The weight loss typically amounts to less than 15 wt % and is mainly due to evaporation of moisture and loss of volatiles due to decomposition of lignin during heating.

By controlling and optimizing parameters such as temperature and time during the thermal stabilization process, a thermally stabilized agglomerated lignin-carbon composite material that retains its shape and dimensions with no fusing or swelling during subsequent processing can be obtained. The described process has an excellent compatibility with the typical process requirements for continuous production, using rotary kiln for example, due to mechanical stability of the agglomerated lignin-carbon composite material and a relatively short residence time. This is of particular importance for achieving an economical large industry-scale process for producing carbon enriched materials.

According to a second aspect, the present invention relates to a thermally stabilized agglomerated lignin-carbon composite material with a particle size distribution such that at least 80 wt % of the agglomerates have a diameter within the range of from 0.2 mm to 5.0 mm, and wherein the thermally stabilized agglomerated lignin-carbon composite material comprises lignin and at least one carbon additive. The thermally stabilized agglomerated lignin-carbon composite material according to the second aspect can be obtained by the method according to the first aspect. The thermally stabilized agglomerated lignin-carbon composite material according to the second aspect may be further defined as set out above with reference to the first aspect.

In the method according to the third aspect of the present invention, the thermally stabilized agglomerated lignin-carbon composite according to the first aspect of the present invention is heat treated to obtain a granular carbon-carbon composite material.

Step 1) of the method according to the third aspect involves providing a thermally stabilized agglomerated lignin-carbon composite material obtainable by the method according to the first aspect.

By providing a lignin-carbon composite material in the form of a thermally stabilized agglomerated lignin-carbon composite material, a material that will retain its shape and dimension, avoiding melting/swelling and deformation during subsequent heat treatment is achieved.

Step 2) of the method according to the third aspect involves subjecting the thermally stabilized agglomerated lignin-carbon composite material to heat treatment at one or more temperatures in the range of from 300° C. to 1500° C., wherein the heat treatment is carried out for a total time in the range of from 30 minutes to 10 hours, so as to obtain a granular carbon-carbon composite material.

The term "heat treatment" as used herein, refers to a process of heating the thermally stabilized agglomerated lignin-carbon composite material at one or more temperatures and for a sufficient time so that the lignin is converted to carbon. Depending on the temperature during the heat treatment, different types of carbon, such as charcoal or hard carbon, can be obtained from lignin in the lignin-carbon composite material.

The term "carbon-carbon composite material" as used herein in phrases such as "granular carbon-carbon composite material" and "carbon-carbon composite material powder", refers to a composite comprising at least two different carbon materials, one being derived from lignin and the other one being a carbon additive. The carbon-carbon composite material is obtained by heat treatment of the thermally stabilized agglomerated lignin-carbon composite material described herein.

As described above, during heat treatment the lignin in the thermally stabilized agglomerated lignin-carbon composite material will be converted to carbon. Thus, a carbon-carbon composite material is obtained. The total carbon content (i.e. with contribution both from the carbon additive and from the carbon derived from lignin) of the carbon-carbon composite material is preferably at least 90 wt %, or at least 95 wt %, based on the dry weight of the carbon-carbon composite material. In one embodiment, the carbon-carbon composite material comprises hard carbon (derived from lignin) and graphite (as the carbon additive). In one embodiment, the carbon-carbon composite material comprises charcoal (derived from lignin) and graphite (as the carbon additive). In another embodiment, the carbon-carbon composite comprises hard carbon (derived from lignin) and hard carbon (as the carbon additive), i.e. the composite material comprises two distinguishable hard carbon materials.

The at least one carbon additive may also be altered by the heat treatment. Possible alterations involve conversion from one type of carbon to another (such as from charcoal to hard carbon), changes in the crystal structure and in the molecular structure. Thus, hard carbon formed during heat treatment of the lignin part in the thermally stabilized lignin-carbon composite material may after heat treatment be different from hard carbon provided as a carbon additive.

Preferably, the heat treatment comprises a preliminary heating step, preferably followed by a final heating step. The preliminary heating step is preferably carried out at a temperature of between 30° and 800° C., such as between 50° and 700° C. The preliminary heating step is preferably carried out under inert atmosphere, preferably nitrogen atmosphere. The duration of the preliminary heating step is at least 30 minutes and preferably less than 10 hours. The preliminary and final heating steps may be carried out as discrete steps or as one single step in direct sequence. The surface area of the product obtained after the preliminary heating step is typically in the range of from 300 to 700 $m^2/g$, measured as BET using nitrogen gas.

The final heating step is preferably carried out at a temperature between 800° C. and 1500° C. The final heating step is preferably carried out under inert atmosphere, preferably nitrogen atmosphere. The duration of the final heating step is at least 30 minutes and preferably less than 10 hours.

Preferably, the heat treatment is carried out stepwise. Preferably, the preliminary heating starts at about 300° C. and is subsequently increased to about 500° C. The final heating step is preferably carried out between 900° C. and 1300° C., such as at about 1000° C. After the final heating step carried out at 1000° C. or higher, the surface area of the product obtained is typically 10 $m^2/g$ or less.

The heat-treated material, i.e. the granular carbon-carbon composite material which is the product of step 2) preferably has a bulk density in the range of from 0.2 $g/cm^3$ to 0.7 $g/cm^3$. If the amount of lignin in the thermally stabilized agglomerated lignin-carbon composite material is relatively high, the bulk density of the obtained granular carbon-carbon composite material is decreased compared to the bulk density of the thermally stabilized agglomerated lignin-carbon composite material prior to heat treatment, primarily due to mass loss of lignin during heat treatment. If instead the amount of the at least one carbon additive in the thermally stabilized agglomerated lignin-carbon composite material is relatively high, the bulk density of the obtained granular carbon-carbon composite material will not decrease as much, as the mass loss will be less significant in the at least one carbon additive. Thus, the bulk density of the granular carbon-carbon composite material will depend largely on the amount of carbon additive in the thermally stabilized agglomerated lignin-carbon composite material.

As the shape and dimension of the agglomerated lignin-carbon composite material is retained during heat treatment, the granular carbon-carbon composite material preferably has a particle size distribution such that at least 80 wt % of the granules have a diameter within the range of from 0.2 mm to 5.0 mm.

The heat treated material, i.e. the granular carbon-carbon composite material which is the product of step 2) in the method according to the third aspect, is useful for example as bio-char, or as precursor to activated carbon.

In one embodiment, the method comprises an additional step of pulverizing the granular carbon-carbon composite material so as to obtain a carbon-carbon composite material. The pulverization may be performed by any suitable process, using for example a cutting mill, blade mixer, impact mill, ball-mill, hammer mill and/or jet-mill. Optionally, fine/coarse particle selection by classification and/or sieving may be performed subsequent to the pulverization.

The pulverization of the carbon-carbon composite material and optional fine/coarse particle selection may be performed so as to obtain a carbon-carbon composite material powder comprising powder particles having an average particle size ($D_v50$) in the range of from 5 to 25 µm, as measured, for instance, by laser diffraction.

In one embodiment, more than one step of pulverizing or crushing is performed. In addition, the carbon-carbon composite material powder may be subjected to treatments such as coating or further heat treatments.

According to a fourth aspect, the present invention relates to a granular carbon-carbon composite material obtainable by the method according to the third aspect. The granular carbon-carbon composite material according to the fourth aspect may be further defined as set out above with reference to the third aspect.

The granular carbon-carbon composite material obtainable with the method according to the third aspect may also be of use in applications such as activated carbon and biochars.

According to a fifth aspect, the present invention relates to a carbon-carbon composite material powder obtainable by pulverizing the granular carbon-carbon composite material obtained by the method according to the third aspect. The carbon-carbon composite material powder may be further defined as set out above with reference to the third aspect.

According to a sixth aspect, the present invention relates to a negative electrode for a non-aqueous secondary battery comprising the carbon-carbon composite material powder according to the fifth aspect as active material.

The carbon-carbon composite material powder obtained by the method according to the third aspect is preferably used as an active material in a negative electrode of a non-aqueous secondary battery, such as a lithium-ion battery. When used for producing such a negative electrode, any suitable method to form such a negative electrode may be utilized. In the formation of the negative electrode, the carbon enriched material may be processed together with further components. Such further components may include, for example, one or more binders to form the carbon enriched material into an electrode, conductive materials, such as carbon black, carbon nanotubes or metal powders, and/or further Li storage materials, such as graphite or lithium. For example, the binders may be selected from, but are not limited to, poly(vinylidene fluoride), poly(tetrafluoroethylene), carboxymethylcellulose, natural butadiene rubber, synthetic butadiene rubber, polyacrylate, poly(acrylic acid), alginate, etc., or from combinations thereof. Optionally, a solvent such as e.g. 1-methyl-2-pyrrolidone, 1-ethyl-2-pyrrolidone, water, or acetone is utilized during the processing.

According to a seventh aspect, the present invention relates to use of the carbon-carbon composite material powder according to the fifth aspect as active material in a negative electrode of a non-aqueous secondary battery.

EXAMPLES

Example 1

Lignin powder from the LignoBoost process was mixed together with 5, 10 or 20 wt % of a carbon additive in the form of hard carbon having an average particle size of 6 μm, using a conical screw mixer (200 RPM, 15 minutes). No additional additives were added. The mixtures were then compacted by means of roller compaction using a Lab Compactor at 50 kN to obtain a composite material, which was subsequently crushed using a Flake crusher and sieved into granules with a size distribution of from 0.5 to 1.5 mm. The bulk densities of the agglomerated lignin-carbon composite materials were: 0.55 g/cm³ (5 wt % carbon additive); 0.56 g/cm³ (10 wt % carbon additive); and 0.54 g/cm³ (20 wt % carbon additive).

The agglomerated lignin-carbon composites were further thermally stabilized by heating inside a rotary kiln to 235° C. for 2 h in air. During this process, the agglomerated lignin did not exhibit any melting behaviour and retained its original shape. It was found that the individual agglomerates did not fuse together and remained free flowing. The material gradually darkened during the processing until it was completely black and free of smell. The bulk densities of the thermally stabilized agglomerated lignin-carbon composite materials were: 0.63 g/cm³ (5 wt % carbon additive); 0.62 g/cm³ (10 wt % carbon additive); and 0.61 g/cm³ (20 wt % carbon additive).

This thermally stabilized agglomerated lignin-carbon composite material was subsequently heat treated at 500° C. during 1 h under inert atmosphere, to carbonize the material. This yielded a granular carbon-carbon composite material without any melting or fusing of granules and with retained shape/size as compared to the thermally stabilized agglomerated lignin-carbon composite material prior to carbonization. The bulk densities of the obtained granular carbon-carbon composite materials were: 0.47 g/cm³ (5 wt % carbon additive); 0.47 g/cm³ (10 wt % carbon additive); and 0.58 g/cm³ (20 wt % carbon additive).

Example 2—Comparative Example

In this experiment, thermal conversion of conventional lignin powder was carried out. The lignin powder was not agglomerated together with a carbon additive.

Lignin powder from the LignoBoost process was heated to 200° C. for up to 12 h. After the heating, it was found that the lignin had melted/fused into a solid black cake free of smell.

In view of the above detailed description of the present invention, other modifications and variations will become apparent to those skilled in the art. However, it should be apparent that such other modifications and variations may be effected without departing from the spirit and scope of the invention.

The invention claimed is:

1. A method for producing a thermally stabilized agglomerated lignin-carbon composite material, said method comprising the steps of:
   a) providing an agglomerated lignin-carbon composite material having a particle size distribution such that at least 80 wt % of agglomerates have a diameter within a range of from 0.2 mm to 5.0 mm, and wherein said agglomerated lignin-carbon composite material comprises lignin and at least one carbon additive;
   b) heating the agglomerated lignin-carbon composite material to a temperature in a range of from 140 to 250° C. for a period of at least 30 minutes so as to obtain a thermally stabilized agglomerated lignin-carbon composite material.

2. The method according to claim 1, wherein the agglomerated lignin-carbon composite material used in step a) is produced by a method comprising the steps of:
   i) providing lignin in a form of a powder, wherein a particle size distribution of the lignin in the form of the powder is such that at least 80 wt % of particles have a diameter less than 0.2 mm and a moisture content of less than 45 wt %;
   ii) providing at least one carbon additive in a form of a powder; wherein a particle size distribution of the at least one carbon additive in the form of the powder is such that at least 80 wt % of particles have a diameter less than 0.1 mm;
   iii) mixing the lignin, the at least one carbon additive, and optionally at least one additive so as to obtain a lignin-carbon mixture;
   iv) compacting the lignin-carbon mixture obtained in step iii) so as to obtain a lignin-carbon composite material;
   v) crushing the lignin-carbon composite material obtained in step iv) so as to obtain an agglomerated lignin-carbon composite material; and,
   vi) optionally sieving the agglomerated lignin-carbon composite material obtained in step v) so as to remove particles having a particle diameter below 100 μm, thereby obtaining the agglomerated lignin-carbon composite material having a particle size distribution such that at least 80 wt % of the agglomerates have a diameter within the range of from 0.2 mm to 5.0 mm.

3. The method according to claim 2, wherein the mixing in step iii) is performed by dry mixing.

4. The method according to claim 1, wherein the agglomerated lignin-carbon composite material provided in step a) has a bulk density in a range of from 0.5 to 0.7 g/cm³.

5. The method according to claim 1, wherein an amount of the at least one carbon additive in the agglomerated lignin-carbon composite material is in a range of from 0.1 to 60 wt %, based on a dry weight of the agglomerated lignin-carbon composite material.

6. The method according to claim 1, wherein the at least one carbon additive is selected from a group consisting of: graphite, graphene, carbon nanotubes, charcoal, biochar, hard carbon, soft carbon, carbon black, carbon fibers, and electrically conductive carbon.

7. The method according to claim 1, wherein lignin of the agglomerated lignin-carbon composite material is Kraft lignin.

8. The method according to claim 1, wherein the heating of the agglomerated lignin-carbon composite material in step b) is performed by first heating the agglomerated lignin-carbon composite material to a temperature in a range of from 140 to 175° C. for a period of at least 15 minutes and subsequently heating the agglomerated lignin-carbon composite material to a temperature in a range of from 175 to 250° C. for at least 15 minutes.

9. A method for producing a granular carbon-carbon composite material, said method comprising the steps of:

1) providing the thermally stabilized agglomerated lignin-carbon composite material produced by the method according to claim 1;

2) subjecting the thermally stabilized agglomerated lignin-carbon composite material to heat treatment at one or more temperatures in a range of from 300° C. to 1500° C., wherein the heat treatment is carried out for a total time in the range of from 30 minutes to 10 hours, so as to obtain a granular carbon-carbon composite material.

10. The method according to claim 9, wherein step 2) comprises a preliminary heating step, followed by a final heating step.

11. The method according to claim 10, wherein the preliminary heating step is carried out at a temperature of between 40° and 800° C. for at least 30 minutes, or wherein the preliminary heating step is carried out in inert atmosphere, or both.

12. The method according to claim 10, wherein the final heating step is carried out at a temperature between 800° C. and 1500° C. for at least 30 minutes, or wherein the final heating step is carried out in inert atmosphere, or both.

13. The method according to claim 9, further comprising:

pulverizing the granular carbon-carbon composite material so as to obtain a carbon-carbon composite material powder.

14. A negative electrode for a non-aqueous secondary battery comprising:

the carbon-carbon composite material powder obtained by the method according to claim 13 as an active material.

15. A granular carbon-carbon composite material obtained by the method according to claim 9.

16. A thermally stabilized agglomerated lignin-carbon composite material with a particle size distribution such that at least 80 wt % of agglomerates have a diameter within a range of from 0.2 mm to 5.0 mm, and wherein the thermally stabilized agglomerated lignin-carbon composite material comprises lignin and at least one carbon additive.

17. The thermally stabilized agglomerated lignin-carbon composite material according to claim 16, wherein an amount of the at least one carbon additive in the thermally stabilized agglomerated lignin-carbon composite material is in a range of from 0.1 to 60 wt %, based on a dry weight of the thermally stabilized agglomerated lignin-carbon composite material.

18. The thermally stabilized agglomerated lignin-carbon composite material according to claim 16, wherein the carbon additive is selected from a group consisting of: graphite, graphene, carbon nanotubes, charcoal, biochar, hard carbon, soft carbon, carbon black, carbon fibers and electrically conductive carbon.

19. The thermally stabilized agglomerated lignin-carbon composite material according to claim 16, wherein lignin of the thermally stabilized agglomerated lignin-carbon composite material comprises Kraft lignin.

20. The thermally stabilized agglomerated lignin-carbon composite material according to claim 16, wherein the thermally stabilized agglomerated lignin-carbon composite material has a bulk density in a range of from 0.5 to 0.7 g/cm$^3$.

* * * * *